United States Patent
Patchell

(10) Patent No.: US 7,634,341 B2
(45) Date of Patent: *Dec. 15, 2009

(54) DETECTING DEVICE AND METHOD OF USING SAME

(75) Inventor: John W. Patchell, Carleton Place (CA)

(73) Assignee: 1138037 Ontario Ltd. ("Alirt"), Toronto, Ontario (CA)

( * ) Notice: Subject to any disclaimer, the term of this patent is extended or adjusted under 35 U.S.C. 154(b) by 834 days.

This patent is subject to a terminal disclaimer.

(21) Appl. No.: 10/742,988

(22) Filed: Dec. 22, 2003

(65) Prior Publication Data

US 2004/0148063 A1   Jul. 29, 2004

Related U.S. Application Data

(63) Continuation of application No. 09/799,664, filed on Mar. 7, 2001, now Pat. No. 6,753,766.

(51) Int. Cl.
    *G08G 1/16* (2006.01)
(52) U.S. Cl. .................. 701/45; 701/300; 340/938; 342/42; 342/357.07; 382/291; 382/103
(58) Field of Classification Search .......... 701/45, 701/301, 300, 96; 340/435, 436, 685, 686.6, 340/457, 438, 803, 903, 933, 904, 913, 938; 345/854, 709, 710; 250/338.1, 342; 348/153, 348/154, 148, 119, 143; 382/103, 291, 104; 342/42; *G08G 1/16*
See application file for complete search history.

(56) References Cited

U.S. PATENT DOCUMENTS

| | | | |
|---|---|---|---|
| 3,778,823 A * | 12/1973 | Sato et al. | 342/72 |
| 4,136,954 A | 1/1979 | Jamieson | 356/456 |
| 4,260,980 A | 4/1981 | Bates | 340/904 |
| 4,263,585 A | 4/1981 | Schaefer | 340/567 |
| 4,368,428 A * | 1/1983 | Dijkman | 324/178 |

(Continued)

FOREIGN PATENT DOCUMENTS

CA    2108718    10/1993    ............ 40/466

(Continued)

OTHER PUBLICATIONS

Derwent; *Passive Infrared Blind Spot Detector for Vehicles*.

(Continued)

*Primary Examiner*—Tuan C To
(74) *Attorney, Agent, or Firm*—Hoffman & Baron, LLP

(57) ABSTRACT

A detecting device for detecting moving target vehicles from a moving host vehicle, comprising a first detector means mounted to the host vehicle and aligned to a stationary target area for generating at least a first output representative of the stationary target area at least at a time T1, a second detector means mounted to the host vehicle and aligned to the stationary target area for generating at least a second output representative of the stationary target area at least at a time T2, and a control system to receive the first and second outputs and to compare the first output at T1 to the second output at T2 to identify any differences between the outputs, whereby a target vehicle moving in the stationary target area may be detected.

4 Claims, 5 Drawing Sheets

U.S. PATENT DOCUMENTS

| | | | |
|---|---|---|---|
| 4,447,800 A | 5/1984 | Kasuya et al. | 340/904 |
| 4,450,430 A | 5/1984 | Barishpolsky et al. | 340/904 |
| 4,523,095 A | 6/1985 | Keller-Steinbach | 250/349 |
| 4,694,295 A | 9/1987 | Miller et al. | 340/903 |
| 4,766,421 A | 8/1988 | Beggs et al. | 340/904 |
| 4,906,976 A | 3/1990 | Guscott | 340/567 |
| 4,914,673 A | 4/1990 | Imura | 374/130 |
| 4,926,170 A | 5/1990 | Beggs et al. | 340/904 |
| 5,083,025 A | 1/1992 | Blomberg | 250/353 |
| 5,107,120 A | 4/1992 | Tom | 250/342 |
| 5,122,796 A | 6/1992 | Beggs et al. | 340/904 |
| 5,149,025 A | 9/1992 | Utterback et al. | 246/169 A |
| 5,166,681 A | 11/1992 | Bottesch et al. | 340/933 |
| 5,173,881 A | 12/1992 | Sindle | 367/101 |
| 5,249,128 A | 9/1993 | Markandey et al. | 701/96 |
| 5,249,157 A | 9/1993 | Taylor | 340/903 |
| 5,280,555 A | 1/1994 | Ainsburg | 385/116 |
| 5,313,335 A | 5/1994 | Gray et al. | 359/839 |
| 5,339,075 A | 8/1994 | Abst et al. | 340/903 |
| 5,381,009 A | 1/1995 | Brownell | 250/342 |
| 5,424,952 A * | 6/1995 | Asayama | 701/200 |
| 5,442,178 A | 8/1995 | Baldwin | 250/353 |
| 5,455,707 A | 10/1995 | Cipolla | 359/199 |
| 5,463,384 A | 10/1995 | Juds | 340/903 |
| 5,471,214 A * | 11/1995 | Faibish et al. | 342/70 |
| 5,668,539 A | 9/1997 | Patchell | 340/903 |
| 5,689,087 A * | 11/1997 | Jack | 136/213 |
| 5,705,999 A * | 1/1998 | West et al. | 340/941 |
| 5,742,141 A * | 4/1998 | Czekaj | 318/587 |
| 5,742,240 A * | 4/1998 | Asanuma et al. | 340/995.21 |
| 5,784,023 A * | 7/1998 | Bluege | 342/104 |
| 5,790,586 A * | 8/1998 | Hilton et al. | 374/131 |
| 5,793,309 A * | 8/1998 | Nellson | 340/932.2 |
| 6,021,364 A * | 2/2000 | Berliner et al. | 701/1 |
| 6,021,373 A * | 2/2000 | Zuercher et al. | 701/300 |
| 6,044,632 A * | 4/2000 | Schmalz et al. | 56/10.2 R |
| 6,061,001 A * | 5/2000 | Sugimoto | 340/903 |
| 6,184,782 B1 * | 2/2001 | Oda et al. | 340/435 |
| 6,211,778 B1 * | 4/2001 | Reeves | 340/436 |
| 6,282,478 B1 * | 8/2001 | Akita | 701/70 |
| 6,285,778 B1 * | 9/2001 | Nakajima et al. | 382/104 |
| 6,326,620 B1 * | 12/2001 | Willis | 250/338.1 |
| 6,337,638 B1 * | 1/2002 | Bates et al. | 340/904 |
| 6,405,132 B1 | 6/2002 | Breed et al. | 701/301 |
| 6,470,273 B2 | 10/2002 | Halsted et al. | 701/301 |
| 6,606,027 B1 * | 8/2003 | Reeves et al. | 340/436 |
| 6,683,560 B2 * | 1/2004 | Bauhahn | 342/173 |
| 6,753,766 B2 * | 6/2004 | Patchell | 340/436 |
| 6,768,418 B2 * | 7/2004 | Tominaga et al. | 340/444 |
| 6,850,268 B1 * | 2/2005 | Terauchi et al. | 348/148 |
| 6,873,251 B2 * | 3/2005 | Schiffmann et al. | 340/436 |
| 7,027,773 B1 * | 4/2006 | McMillin | 455/41.2 |
| 7,085,400 B1 * | 8/2006 | Holsing et al. | 382/103 |
| 7,106,183 B2 * | 9/2006 | Hong | 340/435 |
| 7,274,332 B1 * | 9/2007 | Dupray | 342/450 |
| 7,366,595 B1 * | 4/2008 | Shimizu et al. | 701/301 |
| 2001/0045520 A1 * | 11/2001 | Asano et al. | 250/342 |

FOREIGN PATENT DOCUMENTS

| | | | |
|---|---|---|---|
| DE | 42 28 794 | 3/1994 | 601/95 |
| DE | 198 16 004 | 10/1999 | 73/715 |
| EP | 0 624 857 A1 | 5/1994 | 202/239 |
| GB | 2124363 | 7/1982 | 60/580 |
| GB | 2350741 | 5/1999 | 73/715 |
| JP | 08218310 A * | 8/1996 | |
| WO | WO 86/03916 | 7/1986 | |
| WO | WO 95/25322 | 9/1995 | |

OTHER PUBLICATIONS

Research Disclosure; *Passive Infrared (IR) Blind Spot Detector for Vehicles*, Jun. 1992, p. 487.

* cited by examiner

DETECTING DEVICE AND METHOD OF USING SAME

CROSS-REFERENCE TO RELATED APPLICATION

This application is a continuation of U.S. application Ser. No. 09/799,664, filed on Mar. 7, 2001 now U.S. Pat. No. 6,753,766, the contents all of which are incorporated herein by reference.

FIELD OF THE INVENTION

This invention relates generally to the field of detecting devices, and more particularly to devices capable of detecting objects, for example, in a vehicle operator's blind spot.

BACKGROUND OF THE INVENTION

Motor vehicle drivers are required to negotiate traffic safely when travelling on public roads. For this reason, cars, trucks and other road-travelling motor vehicles are typically equipped with mirrors positioned both inside and outside the vehicle. The mirrors allow the driver to see a portion of the road behind or beside the vehicle with only a slight shift of the eyes or turn of the head. If other vehicles are visible the driver will be suitably alerted and in position to avoid making an inappropriate move, such as a lane change.

Having an awareness of the presence of neighbouring vehicles is particularly important when changing lanes, either to the left or the right. To change lanes safely the driver needs to ascertain beforehand that there is no vehicle in the adjacent lane. However, for simple reasons of geometry the mirrors that are commonly factory installed in motor vehicles only provide a partial view of the space immediately to the side and towards the back of the vehicle, which needs to be clear to change lanes. The unviewable space, commonly called the "blind spot", is therefore typically checked by the driver physically turning his or her head to the side in a so called "shoulder check" so that the space can be viewed directly. When it is confirmed that the space is clear and that there is no other vehicle fast approaching, the driver can move their vehicle into the desired lane.

While turning one's head can be a partially effective way to check the blind spot, it also creates a safety risk since it forces the driver to take his or her eyes away from the road directly in front of the vehicle. In particular, there is a risk of a collision with a vehicle in the space ahead if that vehicle brakes or decelerates quickly in the moment that the driver is checking the blind spot. Even if the driver does notice the vehicle in front when his eyes return, it may be too late to stop safely. This risk becomes even more acute when driving conditions are less than optimal, such as in heavy traffic, or when there is poor visibility due to night time darkness or adverse weather conditions such as snow or ice on the road. Further, there will always be drivers with limited or no head mobility due to disability or a stiff neck, as well as people with slower than average reaction times such as seniors. Also, drivers of large vehicles such as trucks that sit high above the road may have difficulty seeing small vehicles occupying the lane on the passenger side. Drivers operating under such conditions are much more susceptible to the risk of an accident when changing lanes. Lastly, even with a shoulder check, portions of the field of view will be unviewable due to door pillars, condensation, snow, and the like. It is desired to reduce the number of checks made of the blind spot to reduce the risk of a dangerous situation arising without changing normal safe driving practices or requirements.

For these reasons various attempts have been made in the past to create a safety device capable of automatically detecting the presence of a target vehicle in the blind spot. If possible, this would reduce the need for a "shoulder check" when a lane change can't occur because the desired lane is occupied by another vehicle, without changing normal safe driving practices or requirements. Ideally the device informs the driver whether the lane is clear or occupied, so that the driver need only shoulder check to confirm the lane is clear to change lanes safely while keeping most of his or her attention on the road ahead.

One known type of detecting device taught in U.S. Pat. No. 5,112,796 to Beggs et al actively emits a signal, for example in a short wavelength infrared region, and then detects the presence or absence of a reflected wave from a target vehicle. Active devices such as this however are relatively complex and need both a transmitter and a receiver. Because of the complexity of the components and the number of elements required, such as electrical connection, power supply, signal emitter, and signal detector, active systems tend to be expensive. Further, failure of any one component means the whole system fails. As well, such systems tend to create false positive alarms, due to reflection of the signal off of stationary objects such as parked cars and the like. As a result, such systems have not been broadly commercially deployed.

Another approach involves the use of a thermal emitted radiation detector of the type found in security system motion detectors. These detectors can be used to passively sense the heat being generated as a matter of course by any target vehicle. Such a detector needs no emitter and therefore has the advantage of a relatively simple and inexpensive design. However, this type of detector requires a change in temperature to create a detectable event and therefore is generally only effective when the target vehicle enters or leaves the field of view of the detector. Target vehicles that are travelling at the same speed as the host vehicle or sensor platform and that remain in a fixed position in the blind spot may become undetectable. Thus, a driver may mistakenly assume a vehicle has passed through the blind spot when in fact it remains there. A lane change in such a case could result in an accident.

This particular issue is addressed in the device described in U.S. Pat. No. 5,668,539 to Patchell, the present inventor. In this device thermal emission readings are obtained from a reference position on the road immediately beside the host vehicle, where it is expected that there will be no other vehicle, as well as from at least one position in the blind spot itself. The reference and other emission readings are compared and a detection event arises if there is a substantive difference between the two values. This device however produces false alarms when there is a variation in road temperature between the reference spot and blind spot, such as the cool area created by a shadow under a bridge on a sunny day. Thus, this prior device also suffers from a statistically small but unacceptably high level of false detection events.

What is needed is a detection system which is simple, inexpensive, and reliable, and which does not produce an unacceptable level of false detection events. In the absence of any solution that addresses the practical problems of detecting a target vehicle in a blind spot under real road, traffic, and weather conditions, tragic and costly accidents due to driver blind spot miscalculation will continue to occur.

SUMMARY OF THE INVENTION

What is required is a detecting device and method which overcomes the problems associated with the current devices and methods used for detecting objects such as target vehicles in a blind spot.

Most particularly, the device and method should reliably and accurately alert a driver when a target vehicle has either entered, or is within or exits a blind spot. The device should be able to provide alerts for blind spots on either one or on both sides of the vehicle, as desired. The device and method should just as reliably and accurately avoid false alarms, that is, alerts indicating that there is a vehicle in the blind spot when in fact the lane is clear. Further, it is desirable that the device and method's capacity to render accurate alerts and avoid false alarms remain effective for all practical variations in road, traffic, and weather conditions. This may include, for example, light and dark asphalt, smooth, bumpy, or pot-holed roads, light or heavy traffic, and the presence of sunlight, rain, snow, or ice on the road. As well, the device and method should operate effectively in the presence of shadows cast by nearby or overhead structures such as bridges and naturally occurring objects like trees.

It would be further advantageous for the device to be sufficiently versatile to be used with passenger cars as well as larger vehicles such as recreational vehicles and trucks. Yet another desirable feature would be for the device to be able to measure the absolute temperature of the road, so that warnings of potential black ice conditions could be provided to the driver.

According to the present invention, such a device and method are preferably achieved by successively sampling the level of electromagnetic radiation in a predetermined frequency range from a given position in space in the blind spot, and by comparing the (time adjusted) samples. In this way, common factors that influence the level of such electromagnetic radiation will tend to cancel out. At the same time, the appearance of a passing object such as a vehicle in the blind spot will produce a substantive signal value since successive samples of a given position in space will register different values of electromagnetic radiation as the vehicle passes through the monitored position. This signal value can be then used to trigger an alert for the driver.

According to a first aspect of the present invention, there is provided a detecting device for detecting moving target vehicles from a moving host vehicle, said device comprising:
    a first detector means mounted to said host vehicle and aligned to a stationary target area for generating at least a first output representative of said stationary target area at least at a time T1;
    a second detector means mounted to said host vehicle and aligned to said stationary target area for generating at least a second output representative of said stationary target area at least at a time T2; and
    a control system to receive said first and second outputs, and to compare said first output at time T1 to said second output at time T2 to identify any differences between said outputs;
    whereby a target vehicle moving in said stationary target area may be detected.

According to a second aspect of the present invention there is provided a method for detecting moving target vehicles from a moving host vehicle, said method comprising:

providing a first detector means mounted to said host vehicle and aligned to a stationary target area for generating at least a first output representative of said stationary target area at a time T1, a second detector means mounted to said host vehicle and aligned to said stationary target area for generating at least a second output representative of said stationary target area at a time T2, and a control system to receive said first and second outputs and to compare said first output at T1 to said second output at T2 to identify any differences between said outputs;

generating said first output at time T1, and receiving said first output into said control system;

generating said second output at time T2, and receiving said second output into said control system;

comparing said first and second outputs; and providing an indication of a target vehicle moving in said stationary target area if said comparison of said first and second outputs identifies any differences between said outputs.

BRIEF DESCRIPTION OF THE DRAWINGS

Reference will now be made, by way of example only, to preferred embodiments of the invention as illustrated in the attached figures, in which.

DETAILED DESCRIPTION OF THE PREFERRED EMBODIMENTS

Figure 1:
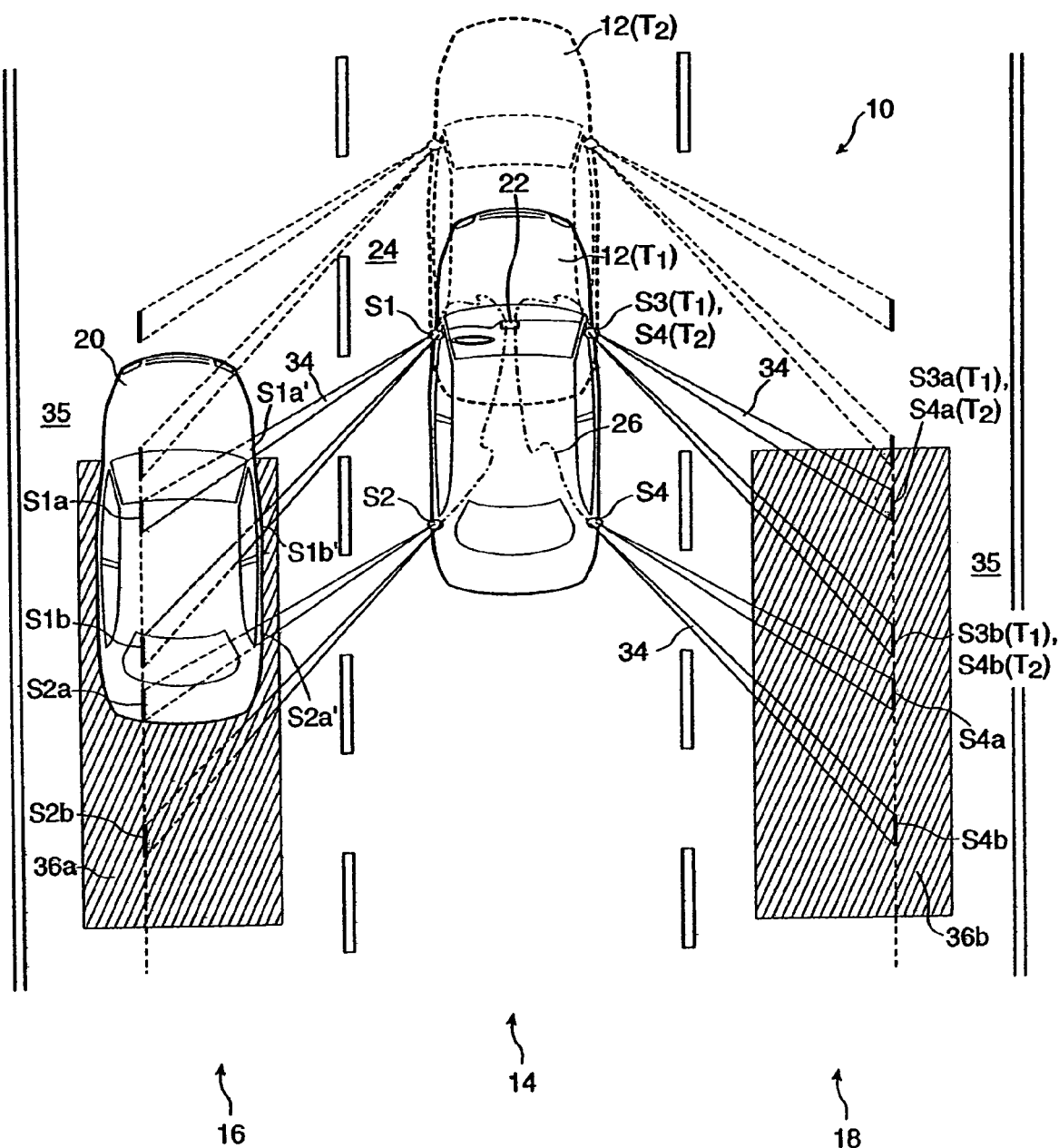
FIG. 1 is a schematic view of the detecting device of the present invention being used in a representative driving environment.

FIG. 1 shows a schematic view of the detecting device of the present invention being used in a representative driving environment on a road 10. The detecting device is shown installed in a host vehicle 12 being driven by a driver (not shown) in a center lane 14 of a 3-lane highway having a left lane 16 and a right lane 18. There is a target vehicle 20 in the left lane 16, and the right lane 18 is empty. In this specification the terms "moving" and "stationary" mean relative to a fixed point, such as a road surface. Thus, a moving host vehicle means a vehicle moving along a road surface, for example. A moving target vehicle means a vehicle moving along a road surface for example, and which may be moving faster, slower, or at the same speed as the host vehicle. Stationary means a fixed point, thus a stationary target area means a specific fixed location, for example, on a roadway.

The detecting device comprises a control system or controller 22 and four detector means or detectors 24, also designated as "S". The controller 22 is preferably located inside the host vehicle 12 in a location visible and accessible to the driver, such as the dashboard. The four detectors 24 comprise a first detector means or front-left sensor S1, a second detector means or rear-left sensor S2, and their equivalents on the right side used to monitor the right lane 18, first and second detector means or sensors S3 and S4 respectively. In this embodiment the sensors 24 or "S" are mounted on the exterior of the host vehicle 12, with two such sensors on each side of the host vehicle 12.

The detector or sensor 24 is any device that is capable of detecting a representative characteristic of a target area and producing a signal or output, typically electrical in nature, representative of the detected characteristic. Preferably, the detected characteristic will be a form of electromagnetic radiation, and most preferably, as explained below, will be thermal radiation. However, the present invention also comprehends such portions of the electromagnetic spectrum capable of being detected by a detector.

As will be understood by those skilled in the art, detectors may function to detect radiation in the medium to far infrared (3 to 20 microns), near infrared (0.78 to 3 microns), visible light (0.4 to 0.78 microns) and ultraviolet (below 0.4 microns). Radiation can be either reflected from the target (e.g. sunlight or from a near IR illuminator) or emitted by the target (thermal radiation or incandescent light such as headlights). For the driving application illustrated in FIG. 1, good results are obtained detecting infrared thermal emitted radiation, which generally occupies the wavelength range between 3-14 microns on the electromagnetic spectrum.

The output or signal generated by each of the detectors or sensors 24 is communicated to and received by the controller 22. In particular, the two sensors representing the first detector means, S1 and S3, each generate a first output, and the two sensors representing the second detector means, S2 and S4, each generate a second output that is received by the controller 22.

Figure 2:
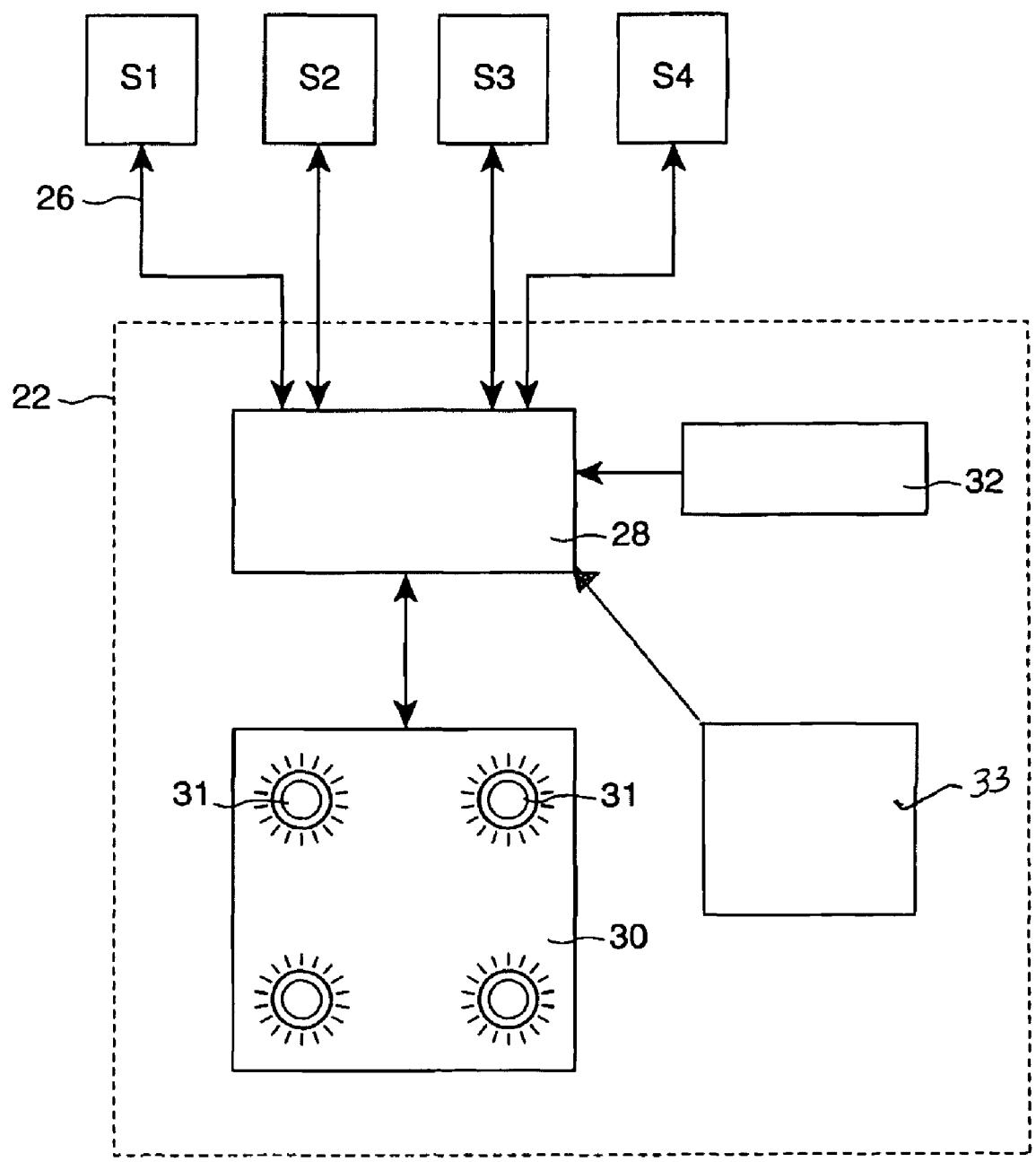
FIG. 2 is a functional block diagram of the detecting device of FIG. 1.

FIG. 2 shows a functional block diagram of the detecting device of the present invention, showing the detector means or sensors 24 and the controller 22. The controller 22 comprises a processor 28 an averaging module 33 and driver display 30, which contains alarm indicators 31. There may also be a speed measurement means or speed sensor 32, which can be a separate Rem such as an external speedometer or may be part of the controller 22 itself. The four sensors 24 are shown having a functional 2-way communication with the processor 28 of the controller 22.

Returning to FIG. 1, A may be seen that each detector 24 detects electromagnetic radiation along two distinct paths 34, each of which is directed towards a particular position or stationary target area 35 on the road 10. In this sense stationary target area means a target area which is stationary relative to the road. Thus, the host vehicle moves past the stationary target area, and any target vehicles may move into, through, and out of the stationary target area. Although this is referred to as an area, it will be appreciated by those skilled in the art that the detectors will detect anything in the path 34, and the path 34 could be convergent or divergent to define a point, line, or area of detection, all of which are comprehended by the term stationary target area.

It may be further seen in FIG. 1 that the target vehicle 20 in left lane 16 falls in both paths 34 detected by sensor S1, and in one path 34 of the radiation detected by sensor S2. In right lane 18 there is no target vehicle, so that all of the radiation detected by sensors S3 and S4 emanates from the corresponding stationary target areas 35 on road 10.

FIG. 1 also shows a blind spot 36, represented as a shaded area in the figure and designated as blind spot 36a in left lane 16 and blind spot 36b in right lane 18. In the representative driving environment shown in FIG. 1, the blind spot is that area of the road 10 that is adjacent to the lane occupied by the host vehicle 12, i.e. the left lane 16 or right lane 18, and that may not generally be visible to the driver in the mirrors of host vehicle 12. The detectors 24 are configured so that the radiation received from the stationary target areas 35 on either side generally covers the length of the blind spot.

In general, the blind spots 36 are present because, for simple reasons of geometry, the mirrors that are commonly factory installed in motor vehicles do not usually provide a complete view of the space immediately to the side and towards the back of the vehicle. The blind spot is therefore the area of the road that cannot be seen by using factory-installed mirrors. Blind spots occur even in clear weather, and can expand in size in the presence of adverse weather conditions such as fog, rain, snow, poor lighting, dust, and other situations. Blind spots will also vary depending on the size and mirror configuration of the particular host vehicle 12. Therefore, it can be appreciated that the shaded areas 36a and 36b shown in FIG. 1 are representations of typical blind spots, and that their position relative to host vehicle 12 and their size may change in practice due to a variety of factors.

As will be discussed in greater detail below, the detecting device of the present invention detects the presence of a moving target vehicle 20 which may, for example be in a blind spot 36 of a host vehicle 12 through sensing and processing the changes in radiation (preferably thermal radiation) emitted by or reflected from target vehicle 20. Therefore, in the representative driving situation of FIG. 1, the detecting device of the present invention will alert the driver of host vehicle 12 that the left lane blind spot 36a is occupied by the target vehicle 20, and that the right lane blind spot 36b is clear. Armed with this information, the driver of the host vehicle 12 will be aware that it may be safe to move into the right lane 18, and that it is not safe to move into the left lane 16.

More generally, it can be appreciated that the detecting device of the present invention detects the presence of any moving object proximate to a host vehicle 12, by detecting the radiation at a stationary target area through which the moving target vehicle passes. The term vehicle includes those commonly encountered on the public roads, such as automobiles, trucks, buses, motorcycles, and bicycles, but also may include other types of vehicles. In a broader sense however the term "target" means any moving object which is detectable by the detector or sensor 24, and whose proximity to the host vehicle 12 would affect the course of action of the operator of the host vehicle 12, such as the decision by a vehicle driver whether to change lanes.

Figure 3:
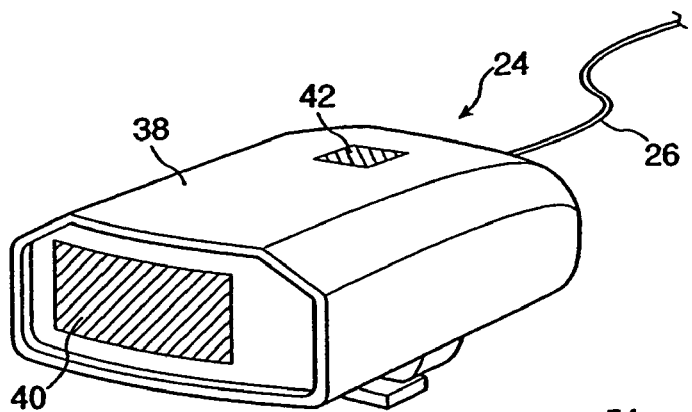
FIG. 3 is a perspective view of one of the sensor units of the detecting device of FIG. 1.

The radiation sensors 24 and controller 22 of the present invention may now be explained in more detail. FIG. 3 shows a representative sensor 24 configured to detect thermal emitted radiation, of the type that might be used to detect a target vehicle 20 in a blind spot in the driving situation shown in FIG. 1. The sensor 24 has a housing 38, window 40, photoelectric window 42, and automotive wiring 26. Thermal emitted radiation 34 enters the sensor 24 through window 40 and ambient light enters the sensor 24 through photoelectric window 42. The automotive wiring 26 provides power to the unit and a communication line with which to exchange information with the controller 22. The unit is preferably powered by 12 volts direct current supplied by the host vehicle battery, but it can be appreciated that other power levels or sources may also be used as appropriate. The housing 38 provides protection from the elements such as rain or snow, and is preferably white to reflect light and keep the temperature of the unit near ambient. The sensor 24 shown in FIG. 3 is therefore in a form suitable for mounting on the exterior of a vehicle, and may accordingly be implemented as an add-on device in the vehicle aftermarket. It can be appreciated that the sensor 24 of the present invention may also be implemented as an "OEM" product that is integrated into the host vehicle itself by the vehicle manufacturer. In that form, the sensor 24 may be mounted directly into the side of the host vehicle with only the window 40 visible.

Figure 4A:
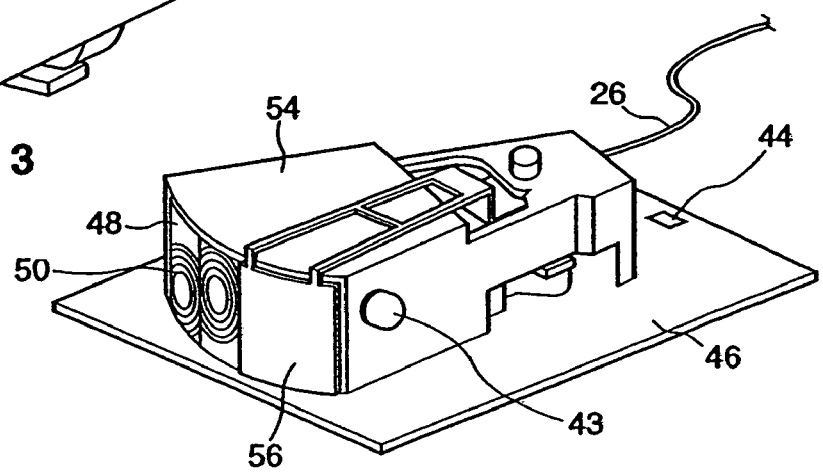
FIG. 4(a) is a perspective view of the interior of one of the sensor units of the detecting device of FIG. 1, showing a shutter in a first position.
Figure 4B:
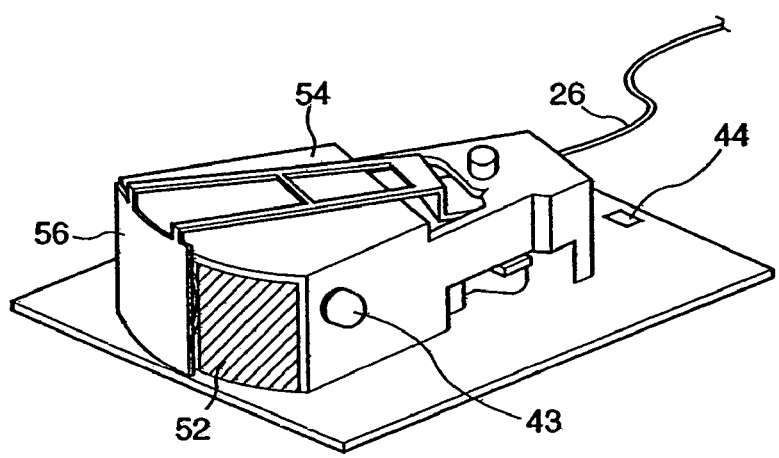
FIG. 4(b) is a perspective view of the interior of one of the sensor units of the detecting device of FIG. 1, showing the shutter in a second position.
Figure 5:
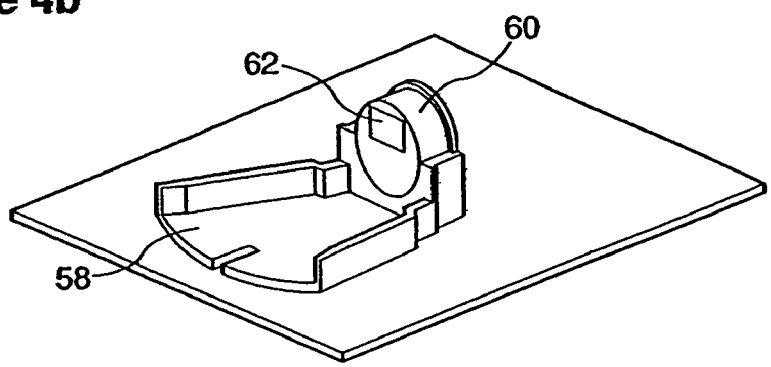
FIG. 5 is a perspective view of the interior of one of the sensor units of the detecting device of FIG. 4, with a lens holder removed.

Whether implemented as an aftermarket or OEM product, a more detailed view of the interior of a representative sensor 24 configured to detect thermal emitted radiation is shown in FIGS. 4 and 5. FIGS. 4(*a*) and 4(*b*) show a circuit board 46, a lens 48 comprising several fresnel lenses 50 on one side and an opaque surface 52 on the other side, a lens holder 54 and shutter 56. The shutter 56, used to chop the thermal signal when a pyroelectric detector is the sensing element, is hinged atone end so that it can swivel between two positions. In a first position, as shown in FIG. 4(*a*), the shutter 56 covers the opaque surface 52. In a second position, as shown in FIG. 4(*b*), the shutter 56 covers the fresnel lenses 50. The shutter movement may be effected by a simple solenoid and coil combination, not shown, or by any other low cost equivalent known in the art.

FIG. 4 also shows a photoelectric detector 44 that may optionally be installed in the sensor 24 to provide additional functionality. The photoelectric detector 44 is positioned directly under the window 42 so as to detect the level of ambient light that passes through window 42. Also shown is a thermistor 43 attached to the lens holder 54. The thermistor 43 provides a measure of the temperature of the surface to which it is attached, and this figure may be communicated to the controller 22 through the automotive wiring 26.

Yet further detail is revealed in FIG. 5, which is a similar view of the interior of the sensor 24 of FIG. 4, with the lens holder 54, shutter 56, and lens 48 removed. FIG. 5 shows an interior space or cavity 58 that is otherwise enclosed by the lens holder 54 and lens 48, and a detecting element 60 having a window 62. Inside the detecting element 60, behind the window 62, is a sensitive element, not shown in the figure, that functions to react in some measurable way to the presence of thermal radiation.

The fresnel lenses 50 focus the radiation 34 onto the window 62 where it can be sensed by the sensitive element inside. Typically the focal length of the fresnel lens is 25 mm. The lenses are commonly made of polyethylene for thermal infrared systems.

The four sensors 24 installed in host vehicle 12 of FIG. 1 are essentially identical except that corresponding left and right sensor pairs, i.e. S1-S3 and S2-S4, are mirror images of one another. That is, the relative positions of the fresnel lenses 50 and opaque surface 52 are reversed between these pairs. The front and back sensor pairs, i.e. S1-S2 and S3-S4, are identical. This arrangement ensures that the range of detectable radiation scanned by the sensors is the same on both sides of the host vehicle 12.

The preferred sensitive element located inside detecting element 60 is either a pyroelectric detector or thermopile, each one having particular advantages and disadvantages as discussed below. A pyroelectric detector is a crystal, commonly composed of lithium, tantalum, and oxygen, that spontaneously polarizes when impacted by thermal radiation. The polarization produces a voltage that can be accessed and processed by the controller 22. A characteristic of the pyroelectric detector is that the polarity or voltage responds to changes in thermal radiation, rather than to the absolute value of the radiation detected. Therefore, in the absence of change, the crystal's voltage tends to decay to zero in accordance with an internal time constant, generally about one second. Thus it is necessary to use a shutter to chop the thermal energy to allow detection of slower moving changes. A typical chopping frequency is 5 Hz. The resulting 5 Hz output signal from the detector is amplified and synchronously demodulated to give a signal proportional to the difference between the scene temperature and the shutter temperature.

The thermopile-based detector does not use a crystal, and is composed of an interface of dissimilar metals that produce a voltage when impacted by thermal radiation. Structurally, the thermopile consists of two types of pads, one of which is exposed to incoming thermal energy through the window 62, and a second type of pad which connects to the case of the detecting element 60 through a heat sink. Unlike the pyroelectric device, the thermopile output is directly proportional to incident radiation rather than to changes in incident radiation. Its output depends on the difference between the detected infrared energy received at the pad exposed through window 62, and its own ambient temperature as registered by the pad connected to the case of the detecting element 60. As a result, the thermopile detector does not need a shutter 56, and a sensor 24 based on a thermopile consists of the same unit as shown in FIG. 4 but with the fresnel lens 48 constantly exposed.

It can be appreciated that in addition to holding the lens 48 in place, the lens holder 54 creates the interior space or cavity 58 through which radiation can pass to reach the sensitive element. It also functions to keep unwanted radiation from the sides from impinging on the detector. This is especially important for thermopile detectors, since the output is directly proportional to the sum of all thermal energy impinging on the detector. With a pyroelectric detector the radiation from the lens holder is not significant as long as it changes more slowly than the 5 Hz shutter frequency.

The photoelectric detector 44 may be optionally used to provide additional information concerning ambient light levels to the controller 22. This can be used by the controller 22 to assist in determining certain general conditions such as whether it is day or night, sunny or cloudy, as well as whether the host vehicle 12 is passing under a shadow cast by a bridge or building. This information can additionally be used by the controller 22 to adjust the brightness of the driver's display, or as discussed below help check the speed of the host vehicle or vary an internal threshold.

The thermistor 43 may be used to measure the actual temperature of the sensor itself. Using this value and the received thermal emitted radiation, which provides the temperature of the road relative to the sensor, the processor 28 may calculate the actual road temperature and alert the driver of dangerous conditions if appropriate. The thermistor 43 shown in FIG. 4 is attached to the lens holder 54. This is an appropriate position where the sensitive element is a pyroelectric detector, since the temperature of the lens holder 54 will be approximately the same as the temperature of the shutter 56. In the case of a thermopile sensitive element the thermistor 43 is preferably fixed by means of a thermally conductive epoxy to the thermopile case, detecting element 60. Because the thermistor can be closer to the sensitive element, thermopile systems can give more accurate road temperature readings than can pyro-electric based systems, since the reference temperature is more closely measured. The reference junction temperature measurement for the thermopile detector relies principally on the conduction of heat in the detecting element 60.

The sensors 24 when installed must be carefully aligned to a target area. The preferred target areas 35 are about 10-14 feet away laterally, and 20-30 feet longitudinally behind the sensor. These dimensions are preferred because the blindspot is generally located from about 3 to 14 feet out laterally, and back about 20-30 feet from the driver's position. It can be appreciated that directing the sensor to a target area farther than 14 feet out laterally increases the risk of creating a false alarm from detection of a vehicle two lanes over. Since traffic lanes are usually about 12 feet wide, and cars and trucks are about 6-7 feet and 8 feet wide respectively, it can be appreciated that target vehicles within a target area, located as above will be readily detected. The preferred spacing between the front sensor stationary target area and the corresponding rear sensor stationary target area is 10 to 20 feet. It will be appreciated that the present invention is not limited to detecting target vehicles in a blind spot, and the target area could be any area proximate to a host vehicle. Locating the target area in the blind spot is the most preferred form of the present invention.

The sensor of FIG. 3 can be adjusted for distance by aiming it, almost like a headlight. The OEM version may be pre-aligned at the factory, but would similarly be amenable to alignment adjustment in the field. The alignment of the front and back sensors 24, or first and second detector means, is important to the operation of the present invention because, as will be discussed below, the sensors must sense radiation from the same stationary target area 35. One method of alignment that has produced adequate results involves pre-aligning the sensors, mounting the sensors on the host vehicle 12, and then checking the alignment of the sensor housings to ensure it is accurate, namely that each sensor scans the same stationary target area as the host vehicle moves past the same. However, there are a number of alignment techniques that could be used, and it is expected that an appropriate method of alignment for a given application may be selected by a person skilled in the art.

It can also be appreciated that the front and rear sensors may be housed in a single case. As before, there should be two sensors or detector means producing a first output and a second output. This arrangement may however impose an additional burden on the processor 28 to compensate for any differences that may occur in distance and angle of the two fields of view of the target area. Therefore it is generally preferable to house the two detector means separately and to space them apart and along the side of the host vehicle 12, as shown in FIG. 1.

Turning now to the controller 22, this is an electronic device that collects data through its connection with the sensors 24 and decides if there is an alarm situation upon processing the data in the processor 28. If it concludes that there is a target vehicle 20 in the blind spot 36, it alerts the driver through activation of one or more of the alarm indicators 31.

The processor 28 may be any general purpose programmable microprocessor or custom logic device. The alarm indicators 31 may be visual indicators such as light emitting diodes (LED's), and may also include audible indicators such as speakers that produce a loud beep or other alarming sound. As shown in FIG. 2 these elements may be arranged in pairs to represent indicators for the left lane and right lane. Further, it is preferable for the indicators to have both "lane clear" as well as "lane occupied" conditions. For example, the LED's could display a green color when the lane is clear, and a red color (or flashing red) when the lane is occupied.

The controller 22 is preferably housed in a compact enclosure suitable for use inside a car, and placed at a convenient location such as the dashboard where the alarm indicators 31 can be readily discerned by the driver. There may also be a general indicator LED to inform the driver of the operational status of the detecting device. The controller 22 may also include a driver display on/off switch or interrogation mode, to provide the driver with the convenience of turning off the alarm indicators when a lane change is not being contemplated, and an alarm indication would be unnecessary and annoying. In this case the alarm would be active only when the driver chooses to activate the switch. For added convenience, the driver interrogation switch could be integrated with the turn signal lever.

It can be appreciated that the alarm indicators 31 may be positioned on the controller 22 unit itself or at another location remote from the controller, as long as they are accessible to the driver. In particular, it may be desirable to mount visual alarm indicators 31 close to or within the field of view of the host vehicle's external mirrors, so that the driver would be assured of seeing them when changing lanes in any event. This has the advantage of reducing the likelihood that the driver will rely strictly on the indicators and not check the mirrors at all, which is not the intent of the present invention.

In FIG. 1 the controller 22 is shown connected to each of the four sensors 24 through automotive wiring 26, to receive the outputs from those sensors. It may be appreciated by those skilled in the art that other connections besides wiring can also be made, such as wireless. However, wiring is preferred for its low cost and reliability of connection. In FIG. 1*a* separate wiring connection is shown connecting each individual sensor 1 with the controller 22. It can be appreciated that other wiring arrangements may also be satisfactory. For example, the sensors may be connected in series so that only a single wire, containing a multiplexed signal with data from each sensor, connects with the controller 22. This arrangement may be preferred in some cases for reasons of cost and simplicity.

Returning to FIG. 1, the operation of the detecting device of the present invention, when configured to detect thermal emitted radiation, may now be described.

As noted earlier, each of the sensors 24 receives emitted thermal radiation from two given positions or stationary target areas on the road, both located within the blind spot 36. For example, sensor S1 receives radiation from stationary target areas S1*a* and S1*b*, and sensor S2 receives radiation from stationary target areas S2*a* and S2*b*. Where there is a target vehicle 20 in the path between the sensor and the stationary target area, the emitted radiation received by the sensor will be from that vehicle rather than the point on the road. Accordingly, in FIG. 1 at a time T1 sensor S1 receives emitted radiation from stationary target areas S1*a'* and S1*b'* on target vehicle 20, rather than from the corresponding road areas S1*a* and S1*b*. At this same time T1 sensor S2 receives radiation from area S2*a'* on the target vehicle 20 and from S2*b* on the road.

The two readings for each sensor 24 arise because each sensor 24 is shown having two fresnel lenses 50. For each sensor, the outer fresnel lens 50 is directed at the position or stationary target area designated "a", and the inner fresnel lens 50 is directed at the position designated "b". It can be appreciated that a single reading, using a single fresnel lens, is adequate. However it is generally advantageous to use a multi-element lens, such as the one containing two fresnel lenses 50 of this embodiment, since it may allow for a broader scanning range and a more comprehensive average reading. For example, as noted the sensors will generally be set to scan at a distance from the sensor of about 10-12 feet laterally and 25 feet longitudinally behind. Having two fresnel lenses 50 may permit scanning along two distinct longitudinal distances, such as 15 feet and 25 feet, for example. The broader coverage permitted by this arrangement enables the present invention to better detect smaller vehicles such as motorcycles.

In practice it has been found that an "a" scan measuring about 15 feet in length, and a "b" scan measuring about 25 feet in length, gives adequate results in covering the blind spot 36. It can be appreciated that other scanning ranges may be used, depending on the extent of coverage desired. For example, a "b" scan up to 60 feet in length is sometimes preferred where it is desired to confirm that the adjacent lane is clear well behind the host vehicle 12.

As well, since the radiation received by each fresnel lens 50 focuses on the same sensitive element, i.e. the same pyroelectric crystal or thermopile, the resulting sensor signal represents an average or weighted sum of the radiation from the two positions. Therefore the output from S1 is the average of the radiation detected at S1$a$ and S1$b$ (or S1$a'$ and S1$b'$ in FIG. 1). For example, if S1$a$ is 3.0° C. and S1$b$ is 3.2° C., the output from S1 will be 3.1° C. This average will be weighted in proportion to the relative size of the constituent lenses. For example, if there are two fresnel lenses 50 in a 60/40 size ratio, the average will be weighted 60% from the larger lens and 40% from the smaller one. In this way a mufti-element lens provides a more comprehensive average reading, since it samples two or more given positions rather than just one.

The particular road position or stationary target area from which emitted radiation is read, that is, its distance and angle from the sensor, is determined by adjusting the orientation of the lens 48 of the corresponding sensor 24. It can be seen from FIG. 1 that road position S1$a$ is preferably located at the same distance and angle from its corresponding sensor S1 as road position S2$a$ is from S2. Similarly, road position S1$b$ is preferably at the same distance and angle from S1 as S2$b$ is from S2. This relationship is further illustrated in FIG. 1 by the dotted line connecting all four stationary target areas in left lane 16. The same relative relationships occur with respect to the road positions viewed by S3 and S4 in right lane 18. The configuration described above is preferred because sensors S1 and S2, if directed at the same angle, will have the same field of view, which makes the first and second outputs more easily comparable.

Given these relationships between the various stationary target areas, as host vehicle 12 moves forward along center lane 14 ft is apparent that after a time delay "t", road positions S2$a$ and S2$b$ will coincide with where positions S1$a$ and S1$b$ had been "t" seconds earlier. The time delay "t" may be determined from the speed of host vehicle 12 and the separation of sensors S1 and S2. For example, if the speed of host vehicle 12 is 96 km/h and the separation between the sensors is 4.22 m, the time delay "t" is 158 msec. More particularly, at an initial time T1 sensor S1 will detect emitted radiation from road positions S1$a$ and S1$b$. After a time delay "t" at time T2 sensor S2 will detect emitted radiation from road positions S2$a$ and S2$b$, which is the same target area of the road as S1$a$ and S1$b$ at time. T1.

The speed of the host vehicle 12 is measured by the speed sensor 32, which is shown in FIG. 2 as part of the controller 22. The speed sensor 32 is preferably the speedometer already provided with host vehicle 12. In practice this speed information is usually available through the electronic data bus of host vehicle 12.

If it is desired to reduce hardware requirements the separate speedometer or data bus link may be dispensed with and the function of the speed sensor 32 could be fulfilled through calculations performed by the processor 28. Essentially, by comparing successive readings of S1 and S2 the processor 28 may be able to map or shift the signals until they match. In this way the time delay "t" could be determined directly, without requiring the intermediate step of determining the speed of the host vehicle 12. However, for reasons that are explained below, the effectiveness of this method of calculation may depend to some extent on the ambient road and traffic conditions. It will be more accurate where there is less traffic and some natural variation in terrain, such as shadows or other sharp road temperature changes. It will be less effective in dense traffic and in conditions such as rain where the emitted radiation profile of the road is fairly washed-out or uniform. The photoelectric detector 44, if installed, can also provide information for calculating speed when the host vehicle 12 passes under a bridge. This may be used by the processor 28 as a periodic check to confirm that the received speed or measured time shift figure is generally accurate.

For these reasons, the speed figure is preferably received from the host vehicle data bus rather than calculated internally. However, the host vehicle speedometer reading may itself be subject to some error, and this could in turn affect the accuracy of the detecting device of the present invention. In general, the device of the present invention is reasonably fault tolerant and should continue to function adequately even with a speed reading that is up to 5% off the accurate value. If the speed figure cannot be relied on to that level of accuracy then it may be preferable to rely on an internal calculation or some type of add-on speed sensor.

An example of the operation of the detecting device according to the present invention can now be understood. Front sensor S1 receives and averages the emitted thermal radiation from positions S1$a$ and S1$b$ at time T1 (assuming no target vehicle is present). Then, after a time delay "t" at time T2, rear sensor S2 receives and averages the emitted thermal radiation from positions S2$a$ and S2$b$, which at this time are at substantially the same target areas, i.e. the same road positions, as previous readings S1$a$ and Sib had been "t" seconds earlier. Similarly, on the right side of the host vehicle 12, at time T2 sensor S4 detects radiation from positions S4$a$ and S4$b$, which are the same as positions S3$a$ and S3$b$ monitored by sensor S3 at time T1. This may be seen in FIG. 1, which shows host vehicle 12 in dotted outline at time T2. The readings from S1 and S3 at time T1 are the first outputs, and the readings from S2 and S4 at time T2 are the second outputs, for the left and right blind spots respectively. These two sets of readings or first and second outputs are passed on to the controller 22 for further processing as discussed below.

The sensor signals can be sampled and digitized at rates between 200 and 10 Hz depending on the bandwidth of the sensor signals. Processing after that is done digitally and low pass digital filters are applied to give a bandwidth of about 1 to 3 Hz, which is adequate for the present application.

Figure 6:
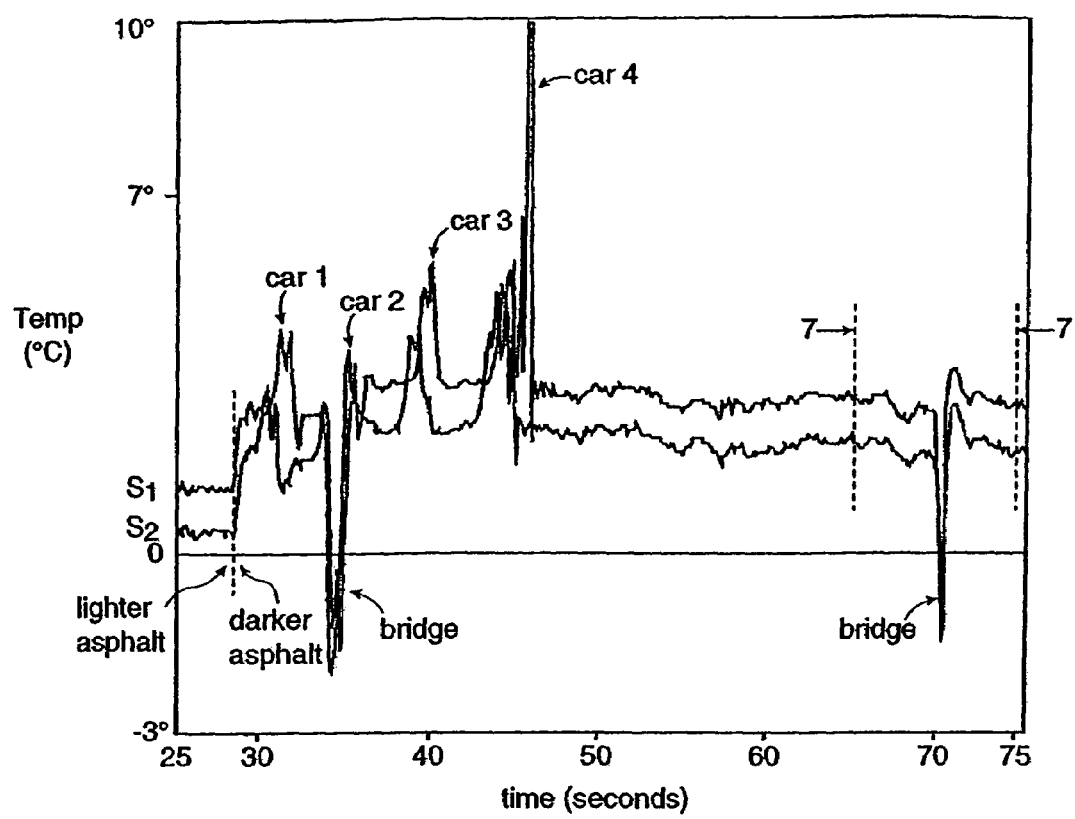
FIG. 6 is a graph of the first and second outputs of the detecting device of FIG. 1.

FIG. 6 is a view of the two received signals S1 and S2 taken over an extended period of time from 25 to 75 seconds, or 50 seconds in duration. As discussed, S2 is a view of the emitted radiation at the same point in space as S1, except at a slightly later time "t".

The sensor readings fluctuate in value in accordance with the detected thermal energy. The zero baseline of the graph is normalized at the temperature of the sensor, and the signal values reflect temperatures relative to the sensor. For example, if the sensor temperature is 2° C., then at 32 seconds, where S1 reads at about 4° C., it indicates that "car 1" is about 4° hotter than the sensor, or about 6° C. Points that are cooler than the sensor 24 display as negative values. The resolution of the sensors commonly used is approximately 0.2 to 0.25° C., though it can be appreciated that sensors of greater or lesser resolution may also be used with adequate results.

The emitted radiation values displayed in FIG. 6 reflect the various natural and traffic conditions encountered by the vehicle in this period from 25 to 75 seconds. At about 29 seconds the road being viewed changes from a light to a dark asphalt, which is hotter, causing the sensor readings to rise. The host vehicle 12 also passes under bridges at about 35 and 70 seconds. Since bridges cast shadows which are generally cooler than the surroundings, especially on sunny days, the corresponding emitted radiation readings S1 and S2 drop dramatically and even go below zero. The negative values indicate that at those points the temperature of the road is lower than the sensor's internal temperature. Accordingly, at about 35 seconds the road temperature under the bridge reads at −2° C., or 2° C. less than the sensor. If the sensors internal temperature is 2° C., the road temperature would be about 0° C. or freezing, indicating a potentially risky black ice situation. As noted, if a thermistor or other temperature measuring device is provided in the sensor, then the processor could calculate the absolute value of road temperature and alert the driver when there are conditions conducive to the formation of black ice.

Finally, between about 30 and 45 seconds four cars or target vehicles pass host vehicle 12. The temperature of a moving vehicle is usually hotter than the road, and this is reflected in the jump in observed values of S1 and S2. The variation in signal strength between the cars, and in particular the sharp rise shown by car 4, reflects the fact that different parts of a vehicle emit different amounts of thermal radiation. For example, the engine, tires, and exhaust areas are very hot, whereas the body, windows, and in particular chrome, are relatively cool and may even be cooler than the sensor 24. Therefore, as shown in FIG. 6, it is likely that the views of car 4 happened to include readings of more hot areas such as the tires or exhaust than occurred with the other three cars.

The device of the present invention functions by detecting differences in thermal emitted radiation between time T1 and T2 as the target vehicle 20 passes through the target area. The absolute values of emitted radiation that a sensor detects from any given target vehicle at T1 and T2 are essentially random in nature. The T1 and T2 readings will vary because different parts of the target vehicle will be sensed at T1 in the stationary target area than at T2. The only time the values at T1 and T2 will be the same is if there is no vehicle in the stationary target area, of if there is a vehicle, it is parked in the stationary target area. In this case there would be no difference in readings and also no alarm. Thus, it can be appreciated that the present invention is directed to detecting moving target vehicles, and not stationary ones. In this way, many false alarm conditions arising in the prior art devices are eliminated.

Figure 7:
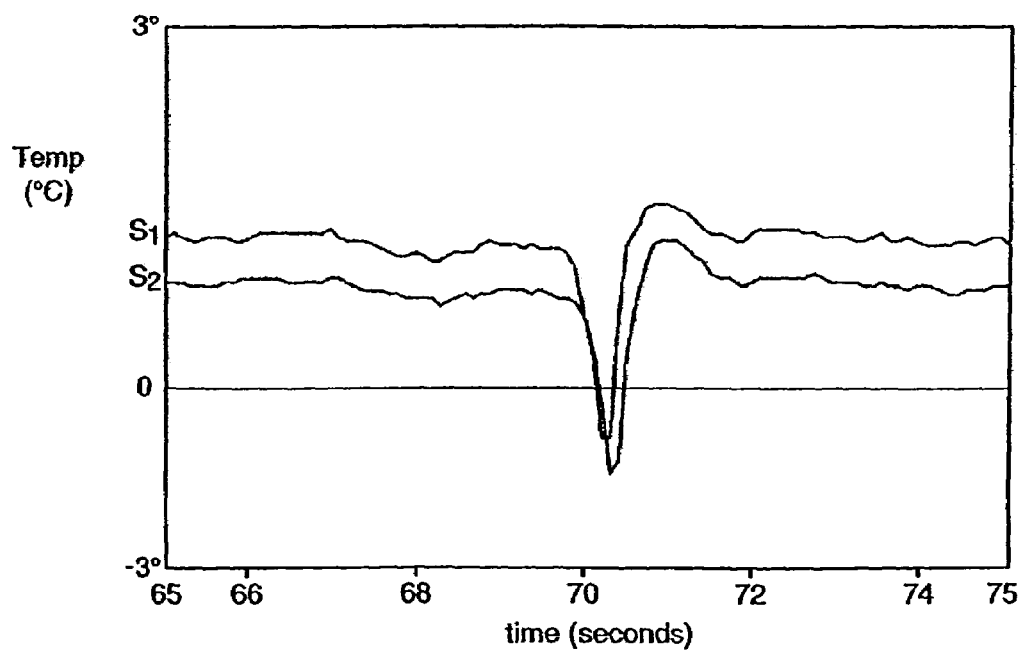
FIG. 7 is an enlarged view of a section 7-7 of the graph shown in FIG. 6 of the first and second outputs of the detecting device.

FIG. 7. is an expanded view of the 65-75 second period of FIG. 6, during which time host vehicle 12 passed under the second bridge. In this expanded view the delay of the rear sensor S2 may be more clearly seen. As noted, the delay time "t" is proportional to the host vehicle speed and the separation between the sensors. In this case as in the example above, the speed of host vehicle 12 is 96 km/h and the separation between the sensors is 4.22 m, so that the time delay "t" is 158 msec. The view of FIG. 7 also shows that, except for the delay, the two signals S1 and S2 track each other very closely. This is to be expected, as the shadow cast by a large stationary object such as a bridge is substantially stationary, especially in the short period a "t" between the readings by S1 and S2.

During the 50 second period, displayed in FIG. 6, host vehicle 12 encounters several "natural" phenomena such as the change in asphalt and presence of bridges, as well as the passing of four target vehicles through, its blind spot. Further, one of the four target vehicles, car 2, happened to pass host vehicle 12 at the same time as host vehicle 12 was going under the first bridge. The present invention recognizes and alerts the driver to the presence of all four moving target vehicles, and at the same time does not provide a false alert due to the change in asphalt or presence of bridges, which are stationary.

Figure 8:
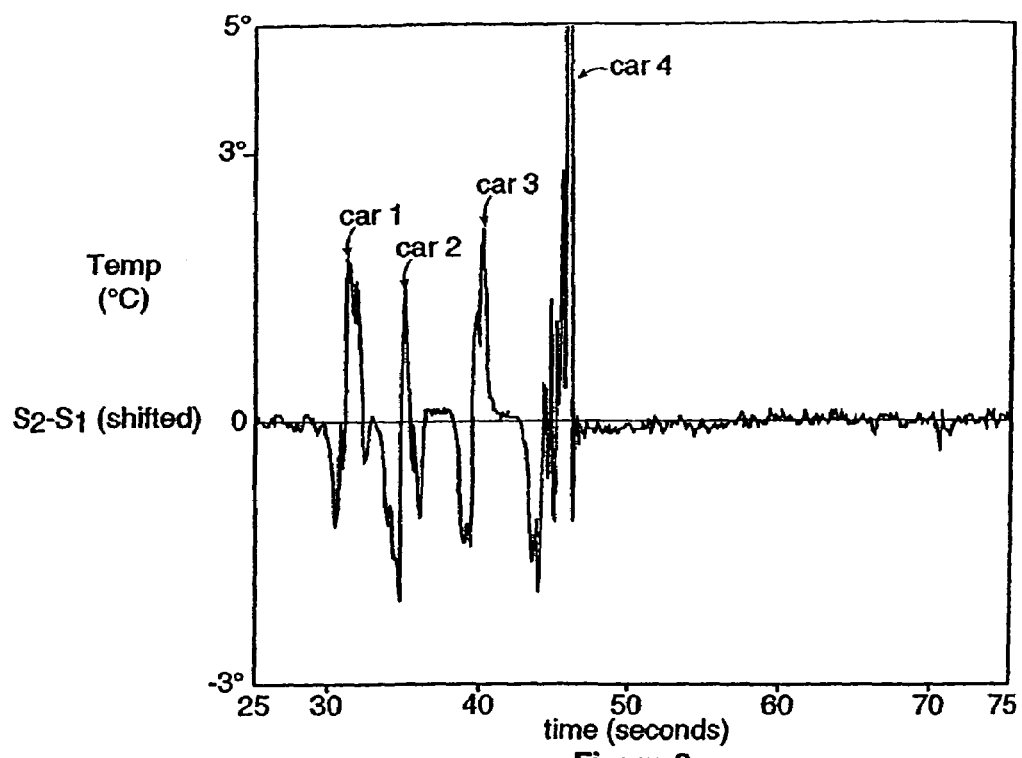
FIG. 8 is a graph of the signal resulting from the subtraction of the time-shifted first output from the second output of FIG. 6 according to the present invention.
Figure 9:
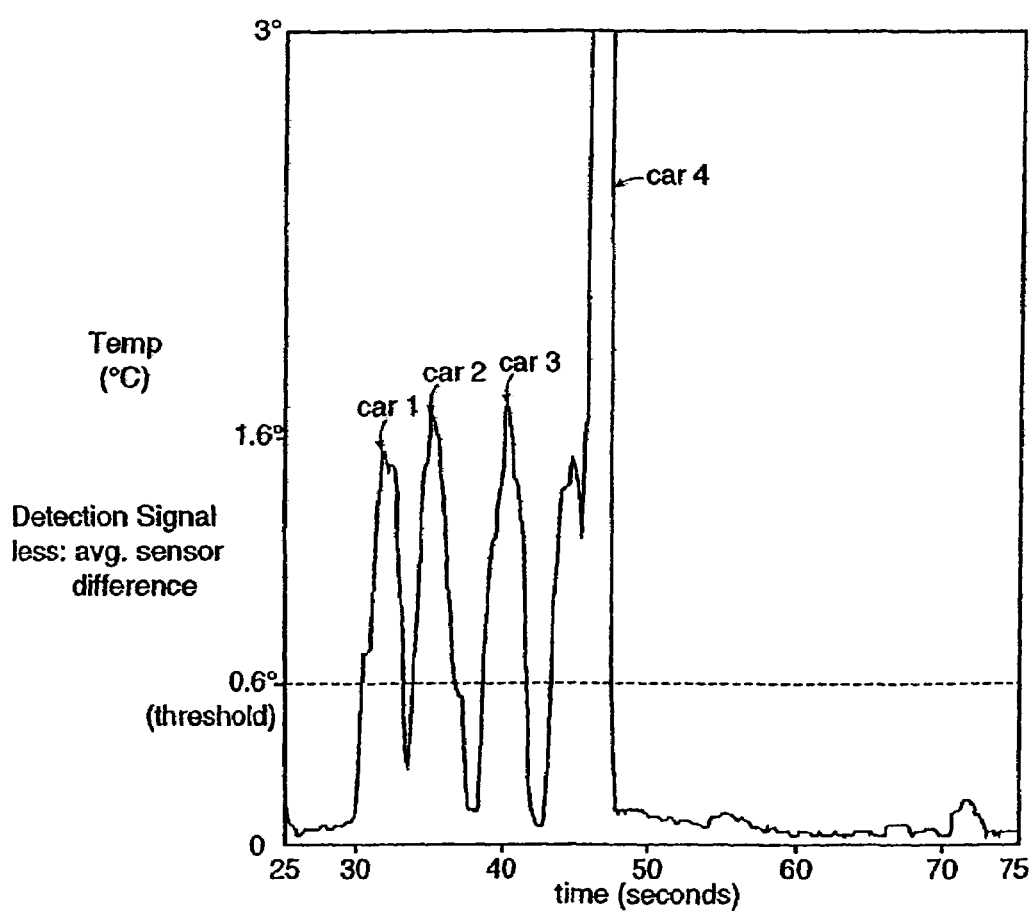
FIG. 9 is a graph of a rectified and low pass filtered version of the subtracted signal of FIG. 8, relative to a threshold value.

FIGS. 8 and 9 illustrate the further processing performed by the controller 22 from which the desired information is extracted. Starting with the received signals S1 and S2 of FIG. 6, which as noted are two signals representing emitted thermal radiation at the same position or positions (if there is more than one fresnel lens 50) in space at successive points T1 and T2 in time, the controller first adjusts for the time delay by shifting S1 appropriately. Graphically, this adjustment may be achieved by shifting S1 to the right by the time delay "t". Subsequently, the signals are compared by subtracting S1 from S2.

The result of the comparison is displayed in FIG. 8. As shown, the asphalt changes and bridge shadows have been eliminated, since each would be identically detected. This desirable result has been achieved because, as shown in FIG. 8, these natural phenomena produce almost identical readings in the front sensor S1 and rear sensor S2, when adjusted for the delay in time. Accordingly, the rise in the 25-30 second region due the change in asphalt has been flattened, as have the drops at 35 and 65 seconds due to the bridge shadows. In FIG. 9 the negative peaks occurring between 30-45 seconds simply reflect periods for which S2 happened to be greater than S1, so that the difference S1-S2 is negative.

It can be appreciated by a person skilled in the art that the flattening of indicators will equally occur for all stationary occurrences, such as for example the presence of snow, ice, debris, potholes, or bumps, on the road. Similarly, environmental constants such as day light or night time darkness, or rainy or sunny conditions, will also cancel out. This occurs because these phenomena are relatively constant in the stationary target area over the typical time between T1 and T2, and therefore present in both views, so they cancel out when the views are subtracted.

Further reviewing FIG. 8, it can be seen that four sharply delineated peaks representing the four target vehicles are present. This desirable result occurs because, unlike the natural phenomena that are common in each view, the target vehicles are always moving relative to the stationary target area from which the readings are taken. Referring to the situation illustrated in FIG. 1 for example, at the initial time T1 sensor S1 will read road position S1a', which happens to be situated at about the front right tire of target vehicle 20. If the target vehicle 20 was not in the path 34 at time T1, sensor S1 would have read road position or stationary target area S1a. After time delay "t", at time T2 sensor S2 will receive radiation from road position S2a, which is in substantially the same place as road position S1a was "t" seconds earlier at time T1. However, by this time target vehicle 20 will have moved, having travelled forward some discrete distance. It may be that by this time the target vehicle has moved entirely past the target area, in which case S2 will read stationary target area S2a. Such a reading would likely be considerably cooler than the reading of the tire made at S1a, "t" seconds earlier. Alternatively, target vehicle 20 may have advanced but still be in the path 34, so that S2 reads S2a' which at time "t" is necessarily some other part of the target vehicle 20 than the front right tire. The result will be that the S1 "a" reading will almost always be different from the S2 "a" reading. The same considerations apply with respect to the "b" readings where two fresnel lenses 50 are used, as in the preferred embodiment illustrated.

Accordingly, any two readings separated in time taken of a target vehicle 20 in the target area are most likely not identical. Further, even if one particular succession of readings happens to be identical, that would only represent one reading out of many taken in a particular time period. Therefore, where there is a target vehicle in the target area it is very unlikely that a larger group of consecutive readings spanning several seconds would be identical and produce a flat result in FIG. 8.

For various reasons the front and rear sensors may have different internal temperatures and so may give different outputs even when looking at the same point on the road. By measuring the sensor internal temperature this difference between the front and rear sensors can be calculated and compensated for. If however the sensor internal temperatures are not measured or can only be measured inaccurately then this compensation is not possible and in general there will be a constant or nearly constant offset in the signal of FIG. 9. This offset can be removed with a high pass digital filter or averaging module, which calculates a running average and subtracts it from the difference. It has been found that a filter with a time constant of 20 seconds is adequate for most situations.

Another source of inaccurate sensor readings may be that one sensor happens to accumulate a layer of ice, dirt, or dust, which would have the effect of reducing the detected level of emitted radiation. While this may be corrected by the operator cleaning off the sensor, until this is done there will continue to be inaccurate readings. In this case the controller 22 could adjust the gain of the weaker sensor to account for the average difference, and then just subtract the signals as before. The controller 22 does this by calculating a variance of each output over time and comparing the two variance figures. In the event the variance of one output differs from the variance of the other output, the gain of the weaker sensor can be adjusted. Where the difference is large enough to indicate a detection error, the controller 22 provides an alert to the driver that the system is non-functional and optionally shuts down the system. Adequate results can be obtained for a detection error set where the variance level of one output is approximately twice the variance level of the other output.

Further processing of the signal is shown in FIG. 9. The signal shown in FIG. 8 is filtered and rectified to yield the signal of FIG. 9. Finally, the signal is compared to a threshold value. Where the signal rises above the threshold the controller sends an alert to the driver display 30, which beeps or flashes a light to inform the driver. In FIG. 9 it can be seen that all four cars produce signals above the threshold, and accordingly the driver will be alerted to their presence in the blind spot.

The level of the threshold, shown in FIG. 9 at about 0.6° C., can be calculated using standard algorithms known to persons skilled in the art. For example, there is the "CFAR" (constant false alarm rate) algorithm, which raises the threshold in response to a higher standard deviation in the input signals. Another way that the controller 22 could adjust the threshold would be by monitoring the general brightness level as measured by the photoelectric detector 44, if installed. A higher brightness level would imply a higher threshold, because high brightness indicates sunshine, which tends to produce the highest contrast environment in terms of variations in scene temperature.

Accordingly, it can be appreciated that the detecting device of the present invention will produce a measurable signal or result when a target vehicle 20 is in the target area of the blind spot 36, and will be likely not to produce a measurable signal or result when the target area is clear for both sensors.

While reference has been made to a detecting device having two detector means or sensors on each side of a host vehicle, it can be appreciated that additional individual sensors or sensor pairs could also be added to provide more comprehensive detection coverage. This may be useful in the case of long vehicles such as transport trucks. An extra sensor or sensor pair may also be useful to monitor the space straight out to the side of a large host vehicle to detect objects positioned in a further blind spot near the front right corner, since this area may also be difficult for the driver to monitor visually.

The extra information provided by the additional sensors or sensor pairs is processed by the detecting device in the same manner as already discussed with respect to the first and second detector means. For example, if there are three sensors S1, S2, and S3 monitoring an adjacent lane, the detecting device would obtain successive samples of a stationary target area 35 from S1 and S2 as before, and an additional set of successive samples of a stationary target area 35 from S2 and S3. The controller 22 would then make the comparisons S1-S2 as before, and an additional comparison S2-S3. If there are four sensors S1, S2, S3, S4, the comparisons could be carried out sequentially as above, or as two separate pairs S1-S2 and S3-S4.

It can therefore be appreciated that the detecting device of the present invention is not restricted to just two detector means, but comprehends two or more detector means. Further, while the terms "detector means", "detector", and "sensor" have been used interchangeably thus far, it may be appreciated that the present invention comprehends an embodiment containing only one detector or sensor. This might involve, for example, having a single sensor and perhaps a system of mirrors or lenses to permit detection of radiation from a stationary target area 35 at successive times T1 and T2. In this case the first and second detector means would each include the same single sensor, but different accessory materials.

It has been noted above that a plurality of detector means may be implemented as part of the detecting device of the present invention. It has also been noted that the location of the stationary target areas can be designated through orientation and alignment of the various detector means. Accordingly, it can be appreciated that the region of interest around the host vehicle 12 that may be monitored for moving target vehicles may be sized and shaped as desired. In the preferred embodiment of the invention, used in the driving situation shown in FIG. 1, that region of interest is the blind spot. However as discussed other regions that may be of interest in other applications, and that may be larger or smaller than the blind spot of a moving vehicle, may be similarly defined and monitored.

The flexibility provided by the detecting device of the present invention in delineating the precise dimensions of a region of interest such as a blind spot is an advantage of the present invention that can be applied in a variety of situations. For example, it has been found useful to set up the stationary target areas so that the area monitored is at least slightly larger than the actual blind spot. The reason is that there is a time lag of about 100 msec between the time that a target vehicle 20 enters the blind spot and the time that an alarm 31 is activated. Then, there is approximately another 300-400 msec of driver reaction time that must be considered. Therefore, it may take about 400-500 msec, or about half a second, for the driver to become aware of and to respond to the entry of a target vehicle in the blind spot. If the host vehicle 12 had already started to change lanes just prior to the entry of the target vehicle, the driver of the host vehicle 12 might not be able to react in time to avoid an accident. Accordingly, enlarging the target area beyond the blind spot provides an extra margin of time and safety for the detecting device to alert the driver.

It can now be appreciated how the detecting device and method of the present invention addresses some of the problems associated with other automatic blind spot detection devices. Some devices detect thermal radiation from the blind spot at one point in time, but thereby fail to detect target vehicles fixed in the blind spot. Yet other devices measure two different points, the blind spot and a reference point elsewhere on the road, but thereby register false alarms where there is a natural difference in terrain between the two points.

By contrast, the device of the present invention detects radiation from the same stationary target area at distinct, successive points in time. In this way the problem of detecting target vehicles which are moving with respect to the road surface, but which remain stationary or move slowly relative to the host vehicle, for example in the host vehicle driver's blind spot, is avoided since those vehicles will still move relative to a stationary target area, and will thereby cause different first and second outputs for successive readings. The device of the present invention only needs to detect a change, whether warmer or cooler, in thermal emitted radiation in that given position between one time sample and the next, to detect the presence of a target vehicle.

Similarly, the problem of false alarms from natural differences in terrain or variations in weather are avoided, because only one target area is being viewed rather than two. When two signals view the same target area and are then compared as in the current invention, the common, stationary features of the target area cancel out.

The device of the present invention is further useful as an accessory that complements and promotes the safer use of mirrors. The driver does not need to make unnecessary shoulder checks when the device signals that a target vehicle is present, thereby reducing the risk of an accident with the vehicle in front of the driver. When changing lanes the device provides a further level of assurance in addition to the driver's use of the mirrors and shoulder check.

It will be appreciated by those skilled in the art that the foregoing description was in respect of preferred embodiments and that various alterations and modifications are possible within the broad scope of the appended claims without departing from the spirit of the invention. For example, the controller may include a self diagnostic procedure that can shut down operation of the device when it is found that a detector is defective. The invention may also be used with active systems of detection, where a signal is actively generated and transmitted to the stationary target area, and the detected radiation is a reflection rather than a passive emission. Various other modifications will be apparent to those skilled in the art but are not described in any further detail herein.

I claim:

1. A method for detecting a vehicle moving relative to, and in proximity to a moving host vehicle comprising the steps of:
   providing a first detector on said host vehicle, said first detector for detecting said moving vehicle in a target area which is stationary relative to a road at a first time;
   providing a second detector on said host vehicle, said second detector for detecting said moving vehicle in said stationary target area at a second time;
   providing a control system for
      receiving outputs from said first and second detectors;
      comparing said outputs at said first and second times to verify the presence of said moving vehicle in said stationary target area;
      recording said outputs at said first and second times;
      averaging said outputs; and
      adjusting said outputs using said averaged outputs to compensate for changes in said outputs not originating from said target vehicle.

2. A method of claim 1 further including the step of:
   generating an alarm upon verification of said presence of said moving vehicle in said target area.

3. A method of claim 1 wherein said detecting steps further includes:
   thermally detecting said moving vehicle.

4. A detection system for detecting a vehicle moving relative to, and in proximity to a moving host vehicle, said system comprising:
   first detection means mounted to said host vehicle for detecting said moving vehicle in a target area which is stationary relative to a road at a first time;
   second detection means mounted to said host vehicle for detecting said moving vehicle in said stationary target area at a second time;
   means for comparing said detection at said first and second times to verify the presence of said moving vehicle in said stationary target area, wherein said comparing means includes:
      a control system to receive output from said first and second detection means at said first and second times, and wherein said control system further includes an averaging module for recording said outputs at said first and second times, for averaging said recorded outputs, and for adjusting said outputs to compensate for changes in said outputs not arising from said target vehicle.

* * * * *

UNITED STATES PATENT AND TRADEMARK OFFICE
CERTIFICATE OF CORRECTION

PATENT NO. : 7,634,341 B2  Page 1 of 1
APPLICATION NO. : 10/742988
DATED : December 15, 2009
INVENTOR(S) : John W. Patchell It is certified that error appears in the above-identified patent and that said Letters Patent is hereby corrected as shown below:

On the Title Page patent incorrectly reads, Item "(74) Attorney, Agent, or Firm - Hoffman & Baron, LLP"; the patent should read Item --(74) Attorney, Agent, or Firm -Hoffmann & Baron, LLP--.

At column 5, line 51, the printed patent reads "...can be a separate REM..."; the patent should read instead as --...can be a separate item...--.

At column 7, line 25, the printed patent reads "...atone end so that..."; the patent should read instead as --...at one end so that...--.

At column 11, line 29, the printed patent reads "...a mufti-element lens..."; the patent should read instead as --...a multi-element lens...--.

At column 12, line 41, the printed patent reads "...S1a and Sib had been..."; the patent should read instead as --...S1a and S1b had been...--.

At column 14, line 2, the printed patent reads "...short period a "t" between the..."; the patent should read instead as --...short period "t" between the...--.

At column 14, line 59, the printed patent reads "...road position Sla was "t" seconds..."; the patent should read instead as --...road position S1a was "t" seconds...--.

Signed and Sealed this

Sixth Day of April, 2010

David J. Kappos
*Director of the United States Patent and Trademark Office*